United States Patent
Khalili et al.

(10) Patent No.: US 9,870,646 B2
(45) Date of Patent: Jan. 16, 2018

(54) THREE-DIMENSIONAL MODEL GENERATION BASED ON TWO-DIMENSIONAL IMAGES

(71) Applicant: VIRTUAL OUTFITS, LLC, Beverly Hills, CA (US)

(72) Inventors: Matthew Khalili, Beverly Hills, CA (US); Farzaneh Khalili, Beverly Hills, CA (US)

(73) Assignee: Virtual Outfits, LLC, Beverly Hills, CA (US)

( * ) Notice: Subject to any disclaimer, the term of this patent is extended or adjusted under 35 U.S.C. 154(b) by 151 days.

(21) Appl. No.: 14/942,698

(22) Filed: Nov. 16, 2015

(65) Prior Publication Data

US 2016/0379419 A1 Dec. 29, 2016

Related U.S. Application Data

(60) Provisional application No. 62/185,526, filed on Jun. 26, 2015.

(51) Int. Cl.
*G06T 17/20* (2006.01)
*G06T 19/20* (2011.01)

(52) U.S. Cl.
CPC .......... *G06T 19/20* (2013.01); *G06T 2210/16* (2013.01); *G06T 2219/2021* (2013.01)

(58) Field of Classification Search
CPC .............................. G06T 19/20; G06T 19/205
See application file for complete search history.

(56) References Cited

U.S. PATENT DOCUMENTS

| 6,046,745 | A | * | 4/2000 | Moriya | G06T 7/70 |
| | | | | | 345/420 |
| 6,809,887 | B1 | * | 10/2004 | Gao | G02B 13/06 |
| | | | | | 348/48 |
| 7,650,266 | B2 | | 1/2010 | Muller-Fischer et al. | |
| 2007/0273711 | A1 | | 11/2007 | Maffei | |
| 2010/0021082 | A1 | * | 1/2010 | Declerck | G06T 1/00 |
| | | | | | 382/294 |

(Continued)

FOREIGN PATENT DOCUMENTS

| CN | 103366401 | 10/2013 |
| CN | 103533449 | 1/2014 |

(Continued)

*Primary Examiner* — Phi Hoang
(74) *Attorney, Agent, or Firm* — Fish IP Law, LLC

(57) ABSTRACT

A 3D model generation engine is programmed to generate a 3D model of a piece of clothing based on a number of 2D images of the piece of clothing. Specifically, the 3D model is generated by deforming a 3D model template using control points that are automatically pinned to different locations of a representation of the piece of clothing on the 2D image(s). The 3D model template includes multiple bisectional planes. Each bisectional plane has multiple vertices and 3D control points. At least one 2D image of the piece of clothing is obtained, and different locations on the 2D image are determined for several 2D control points. The 3D model template is modified by deforming the bisectional planes (and its associated vertices) of the 3D model template based on the determined location of the 2D control points on the 2D image.

18 Claims, 7 Drawing Sheets

(56) References Cited

U.S. PATENT DOCUMENTS

| | | | |
|---|---|---|---|
| 2012/0065510 A1* | 3/2012 | Snare | A61B 8/14 600/443 |
| 2012/0141018 A1* | 6/2012 | Shiell | G06K 9/621 382/159 |
| 2014/0192046 A1* | 7/2014 | Paragios | G06T 15/005 345/419 |
| 2014/0333614 A1 | 11/2014 | Black et al. | |
| 2015/0084955 A1 | 3/2015 | Chen et al. | |
| 2015/0134496 A1 | 5/2015 | Grinblat et al. | |
| 2015/0154691 A1 | 6/2015 | Curry et al. | |

FOREIGN PATENT DOCUMENTS

| | | |
|---|---|---|
| CN | 102982578 | 6/2015 |
| EP | 2184714 | 12/2011 |

\* cited by examiner

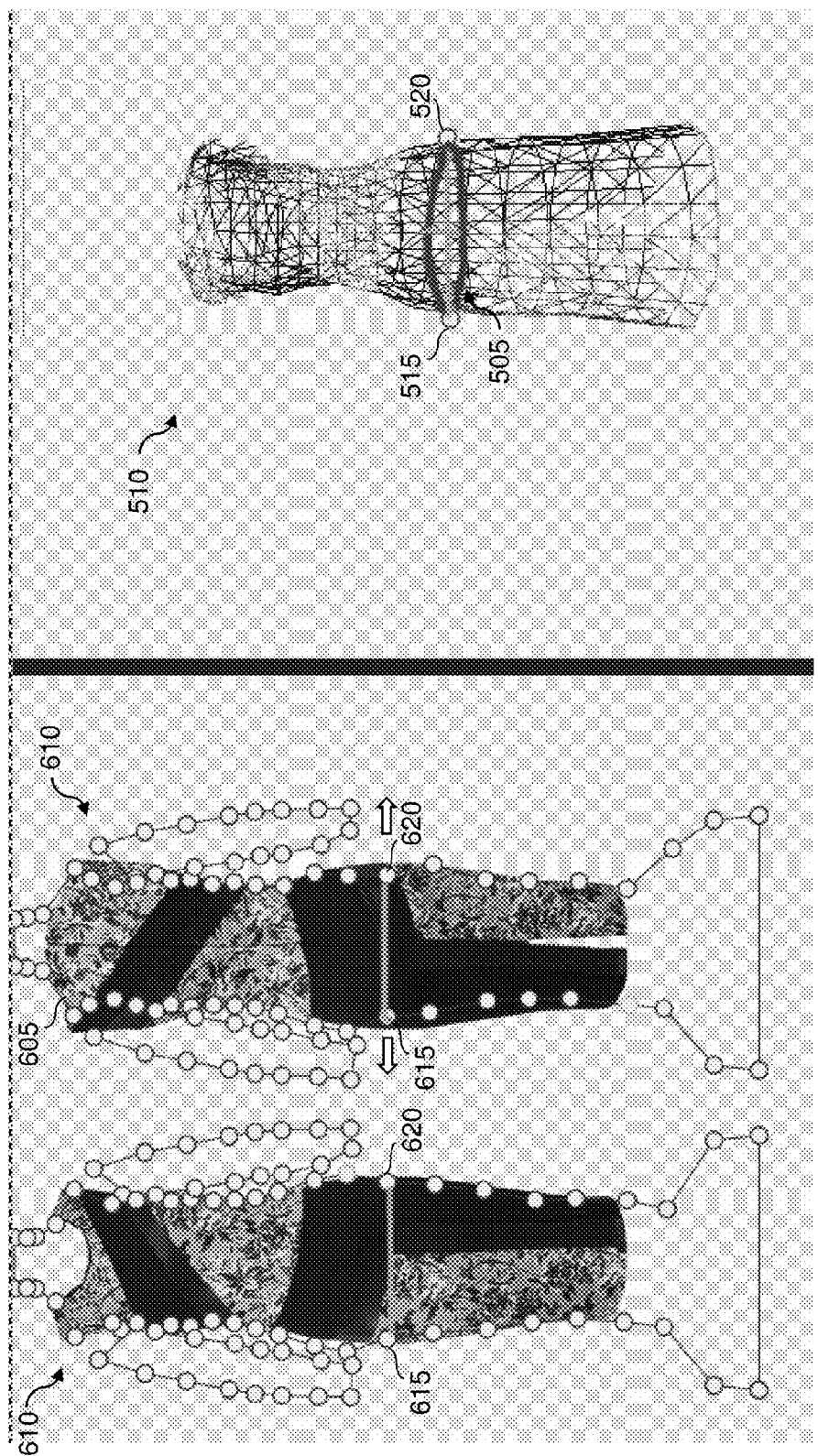

THREE-DIMENSIONAL MODEL GENERATION BASED ON TWO-DIMENSIONAL IMAGES

This application claims the benefit of U.S. provisional application No. 62/185,526 filed Jun. 26, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is three-dimensional (3D) model technologies.

BACKGROUND

The following description includes information that may be useful in understanding the present invention. It is not an admission that any of the information provided herein is prior art or relevant to the presently claimed invention, or that any publication specifically or implicitly referenced is prior art.

Generation of a 3D model of a real-life object can be time consuming and extremely challenging to scale. Even if limited to one specific type of objects, such as clothing, there are large variation of shapes, styles, and material that pose sufficient challenges to automate 3D model generation. They are currently several known methods to creating 3D models and they have serious disadvantages.

One option is using a 3D scanner to scan the object from different multiple perspectives. But up to now, 3D scanners are uncommon among consumers Another option is to construct a 3D model manually via a computer graphic tool. However, such a computer graphic tool is generally very expensive. Additionally, constructing a 3D model this way usually requires a skilled artist, and takes a lot of time.

The third option is to convert 2D images into 3D models. Currently there are a number existing 3D model generation software products in the market that utilize this method. There exists camera plug-ins that can convert 2D images of an object to a 3D model, but would require taking between forty-five and sixty 2D images from different angles in a specific environment. Thus, due to the complexities and time to generate the 3D models, these software products are incapable of producing 360 degree accurate rotatable 3D model in large volumes in short time) effectively.

Efforts have been made to improve the generation of 3D model. For example, U.S. Patent Publication 2015/154,691 entitled "System and Method for Online Virtual Fitting Room," to Curry et al. describes fitting a chosen garment onto a user's body profile generated avatar using a finite element analysis. U.S. Pat. No. 7,650,266 entitled "Method of Simulating Deformable Object Using Geometrically Motivated Model," issued to Muller-Fischer et al. discloses a method of simulating a deformable object by pulling points in a goal shape towards corresponding points in the goal shape.

Other efforts include Chinese Patent Publication CN102982578 entitled "Estimation Method for Dressed Body 3D Model in Single Character Image," to Chen Xiaowu; U.S. Patent Publication US2007/273711 entitled "3D Graphics System and Method," to Maffei; U.S. Patent Publication US2014/333614 entitled "System and Method for Simulating Realistic Clothing," to Black et al.; U.S. Patent Publication US2015/084955 entitled "Method of Constructing 3D Clothing Model Based on a Single Image," to Chen et al.; Chinese Patent Publication 103366401 entitled "Quick Display Method of Multi-Layered Virtual Clothing Try-On," to Chen; European Patent Publication EP2184714 entitled "Layering Simulation Apparatus, Simulation Method, Simulation Program," to Morimoto et al.; U.S. Patent Publication US2015/134496 entitled "Method for Providing for the Remote Fitting and/or Selection of Clothing," to Grinblat et al.; and Chinese Patent Publication CN103533449 entitled "Method and System for Realizing Three-Dimensional Fitting Based on Intelligent Three-Dimensional Television," to Fan.

However, these 3D model generation products still could not provide an efficient way to convert a limited number of 2D images (one or two) of a piece of clothing automatically into an accurate 3D model of a person wearing the piece of clothing. Thus, there is still a need for an efficient 3D model generation method.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

In one aspect of the inventive subject matter, a 3D model of a piece of clothing is generated based on a limited number of 2D images of the piece of clothing. Specifically, the 3D model is generated by deforming a 3D model template using control points that are automatically pinned to different locations of a representation of the piece of clothing on the 2D image(s). In some embodiments, a 3D model generation engine is programmed to obtain a 3D model template for the piece of clothing, where the 3D model template has multiple bisectional planes. Each bisectional plane includes a group of vertices and a group of 3D control points along the edge of the bisectional plane.

The 3D model generation engine is also programmed to obtain at least one 2D image of the piece of clothing. The 3D model generation engine is then programmed to determine different locations on the 2D image for several 2D control points, where each 2D control point corresponds to a distinct 3D control point in the 3D model template. The 3D model generation engine is programmed to generate the 3D model by deforming (or adjusting the shape of) each bisectional plane based on the determined locations of the 2D control points on the 2D image. The locations are determined based on the shape and size of the piece of clothing.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 5A and 5B illustrate an example bisectional plane on a 3D dress model.

FIGS. 6A and 6B illustrate the process of adjusting 2D control points on an exemplary 2D contour.

DETAILED DESCRIPTION

Figure 1:
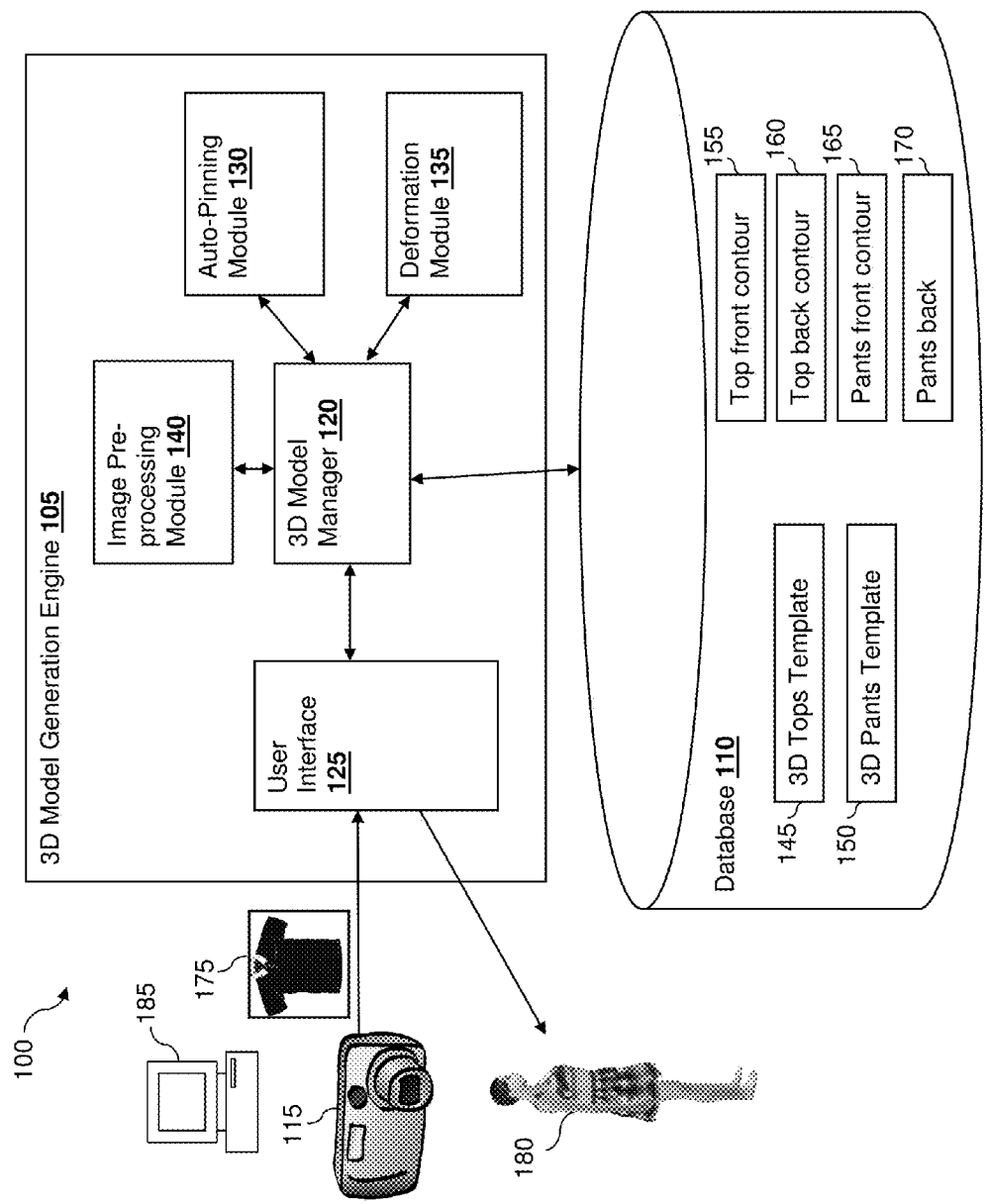
FIG. 1 illustrates an exemplary environment in which a 3D model generation engine operates.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

One should appreciate that the disclosed 3D model generation system provides numerous advantageous technical effects. For example, the 3D model generation system of some embodiments enables fast and efficient generation of 3D model of a piece of clothing based on a limited number of 2D images.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In one aspect of the inventive subject matter, a 3D model of a piece of clothing is generated based on a limited number of 2D images of the piece of clothing. Specifically, the 3D model is generated by deforming a 3D model template using control points that are automatically pinned to different locations of a representation of the piece of clothing on the 2D image(s). In some embodiments, a 3D model generation engine is programmed to obtain a 3D model template for the piece of clothing, where the 3D model template has multiple bisectional planes. Each bisection plane includes a group of 3D control points along the edge of the bisectional plane.

The 3D model generation engine is also programmed to obtain at least one 2D image of the piece of clothing. The 3D model generation engine is then programmed to determine different locations on the 2D image for several 2D control points, where each 2D control point corresponds to a distinct 3D control point in the 3D model template. The 3D model generation engine is programmed to generate the 3D model by deforming (or adjusting the shape of) each bisectional plane based on the determined locations of the 2D control points on the 2D image.

FIG. 1 illustrates a 3D model generation system 100 of some embodiments. The 3D model generation system 100 includes a 3D model generation engine 105, a database 110, a computing device 185, and an image capturing device (e.g., a camera) 115. The 3D model generation engine 105 includes a 3D model manager 120, a user interface 125, an auto-pinning module 130, a deformation module 135, and a uvmap module 140.

The database 110 is configured to store different 3D model templates. Depending on the type of objects of which one wants to generate a 3D model, the database 110 can store 3D model templates specifically for that type of objects. For example, when the 3D model generation system is configured to generate 3D model of clothing, the database 110 can store templates of 3D clothing models. As shown, the database 110 stores two different 3D clothing templates—a 3D tops template 140 and a 3D pants template 145.

3D Clothing Templates

Figure 2B:
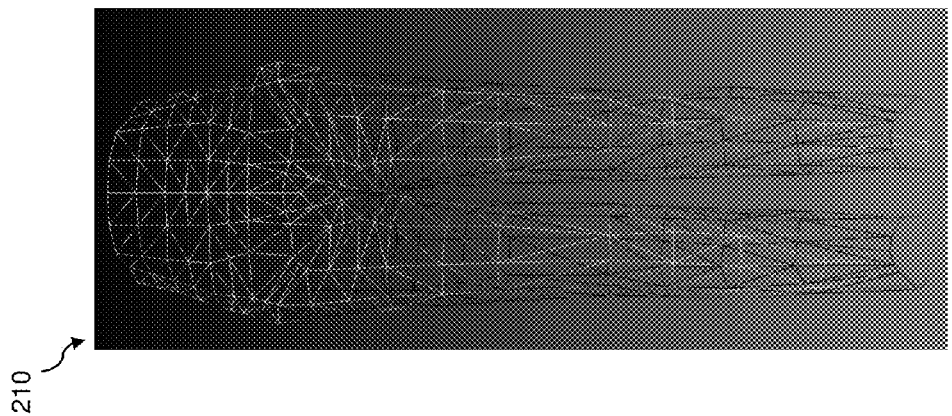
FIGS. 2A and 2B illustrate two exemplary 3D clothing templates.
Figure 2A:
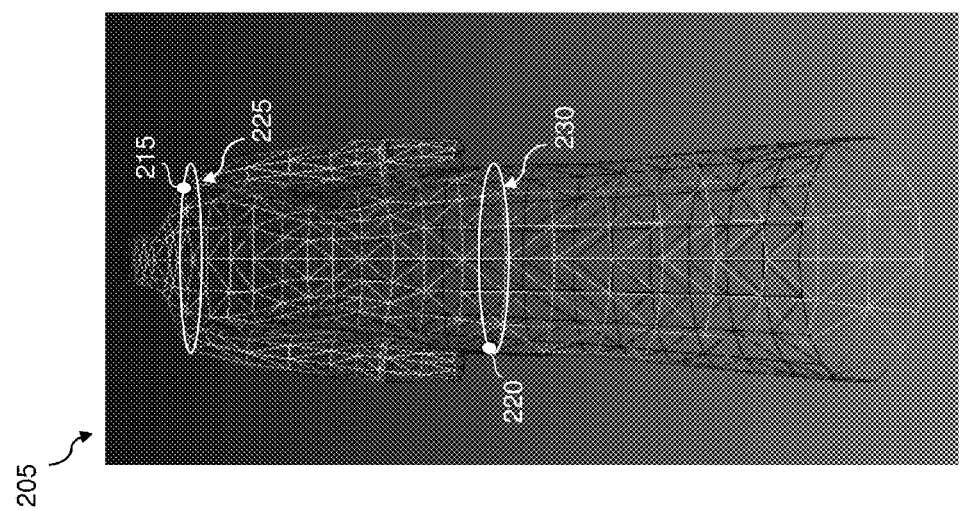

In some embodiments, any types of clothing models (e.g., a coat model, a dress model, a shirt model, a shorts model, etc.) can be derived from one of these 3D model template. For example, the 3D tops template can be used to derive a coat model, a dress model, and a top categories model. FIG. 2A illustrates an example of a 3D tops template 205. As shown, the 3D tops template 205 is shaped as a long and loose dress that covers from the top of the neck to the bottom of the toes.

Another template—the 3D pants template 145, can be used to create all types of pants models and shorts models. FIG. 2B illustrates an example of a 3D pants template 210. As shown, the 3D pants template is shaped as a pair of loose pants that covers from above the waist area to the bottom of the feet.

Pre-Processing the 2D Images

Referring back to FIG. 1, the 3D model manager 120 is programmed to obtain a 2D image 175 via the user interface 125. The 2D image 175 can be obtained from the camera capturing device 115 or the computing device 185. Once the 2D image 175 is obtained, the 3D model manager 120 sends the image 175 to the image pre-processing module 140 to perform a set of pre-processes before using it to generate a 3D model. First, the image pre-processing module 140 is programmed to remove the irrelevant background of the image that is not part of the object of interest (e.g., not part of the clothing item) and then automatically crop the portion of the image 175 that contains only the object of interest. Various known techniques can remove image background and automatically crop images in batch (e.g., Gimps, ImageMagic, etc.). In some embodiments, when the 2D image of the front of the piece of clothing and the 2D image of the back of the piece of clothing were captured at the same location, the pre-processing module 140 is programmed to determine pixels that are the same across the two images and remove the pixels that remain the same across both 2D images. As such, the image pre-processing module 140 of some embodiments is programmed to use these software in removing solid background colors and automatically crop images in batch. The resulting 2D image includes only the object of interest and empty space. It is noted that the pixels representing the empty space are referred to as "alpha pixels" and the pixels representing non-empty space are referred to as "non-alpha pixels."

2D Contours

Figures 4A, 4B:
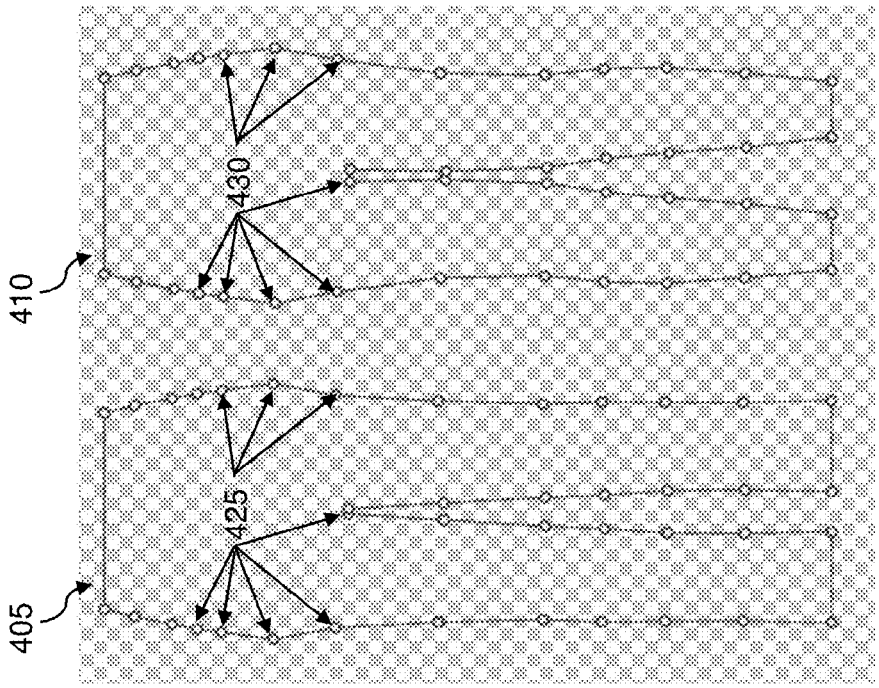
FIGS. 4A and 4B illustrate exemplary front and back 2D contour corresponding to a 3D pants model.
Figures 3A, 3B:
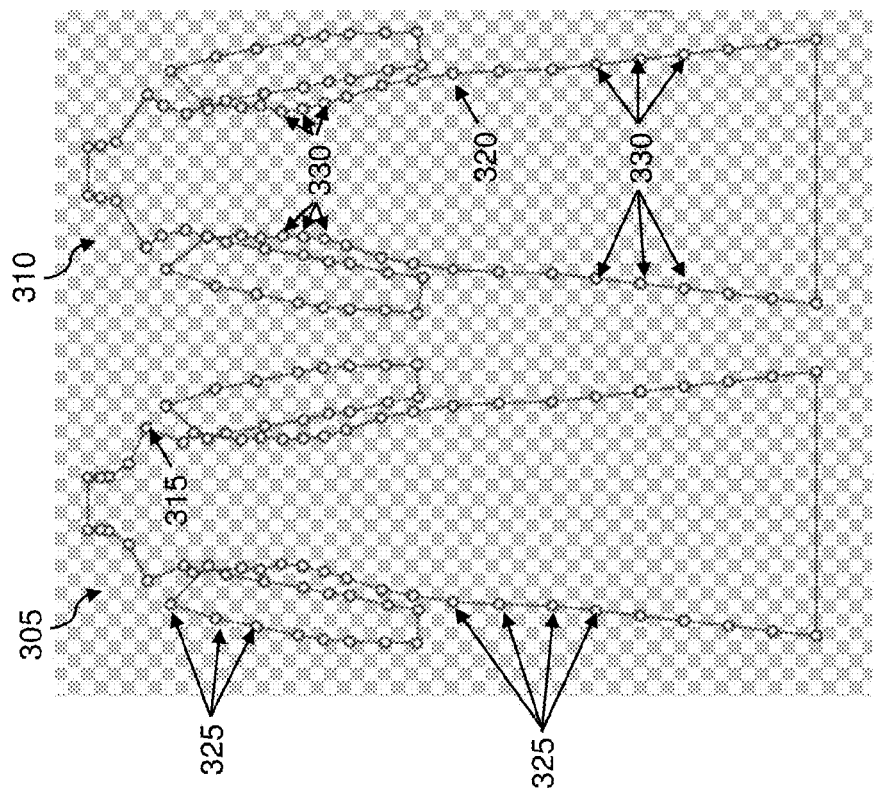
FIGS. 3A and 3B illustrate exemplary front and back 2D contour corresponding to a 3D dress model.

In addition to the 3D model templates, the database 110 also stores 2D contours that correspond to the 3D model templates. In some embodiments, one contour is made for the front of a type of clothing and another identical one made for the back of that same type of clothing. In this example, the database 110 stores a top-model front 2D contour 155 and a top-model back 2D contour 160 that correspond to the 3D tops model template 145, and a pants-model front 2D contour 165 and a pants-model back 2D contour 170 that correspond to the 3D pants model template 150. FIGS. 3A and 3B illustrate examples of a top-model front 2D contour 305 and the top-model back 2D contour 310, respectively. FIGS. 4A and 4B illustrate examples of the pant-model front 2D contour 405 and the pant-model back 2D contour 410, respectively.

As shown, there are control points (e.g., control points 325 on the top-model front 2D contour 305, control points 330 on the top-model back 2D contour 310, control points 425 on the pant-model front 2D contour 405, and control points 430 on the pant-model back 2D contour 410) placed on the edge of the 2D contours. Each of these control points is mapped to a 3D control point on the corresponding 3D model template. The control points enable the 3D model generation engine 105 to define a mapping between different locations (pixels) on the 2D image and different polygons on the 3D model. For example, the 2D control point 315 on the top-model front 2D contour 305 is mapped to the 3D control point 215 on the 3D tops template 205. Similarly, the 2D control point 320 on the top-model back 2D contour 310 is mapped to the 3D control point 220 on the 3D tops template 205. The texture of the piece of clothing on the 2D images are then properly wrapped around the 3D tops template 205. Therefore, the picture of the piece of clothing can be on any angles or can be rotated in any form but still can be captured correctly from the 2D image to a 3D model.

Figure 4C:
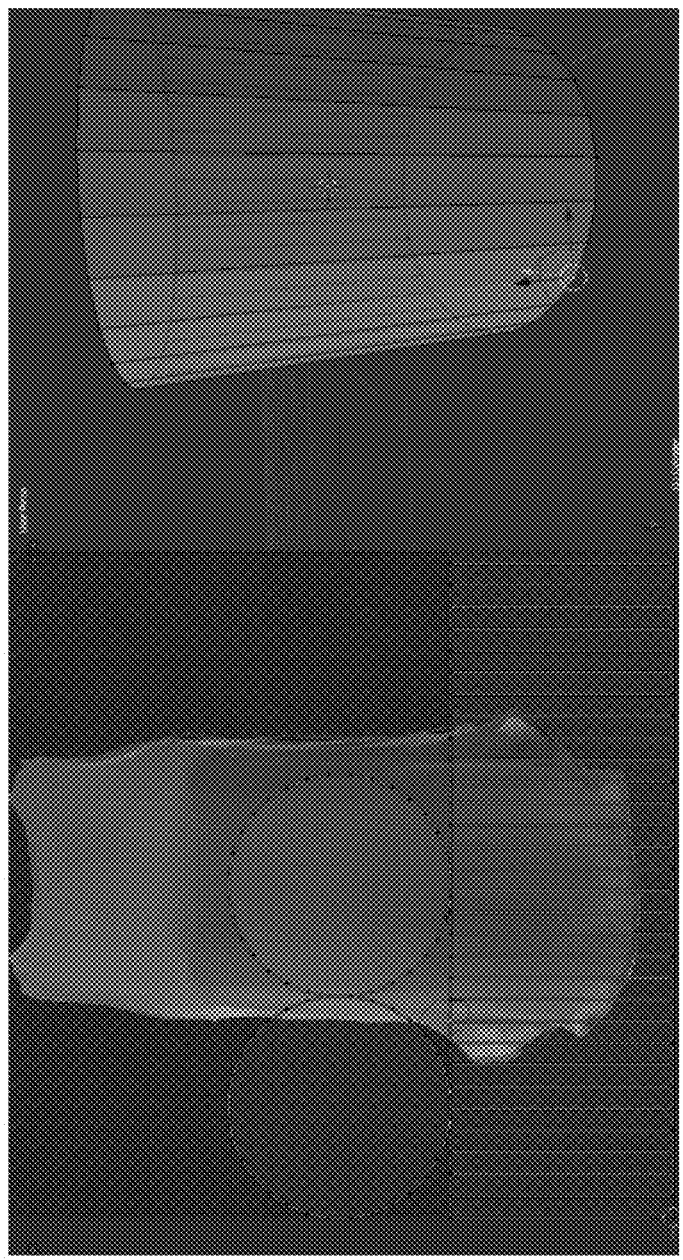
FIG. 4C illustrates shared points for uvmapping.

In some embodiments, UV coordinates are used for texture mapping. FIG. 4C illustrates how 3D vertices should be mapped to UV coordinates. UVs are generated as clothes template UV islands from 3D template models. Each UV point maps directly to vertice of template 3D model. Some UVs point share the same 3D model vertice because UV islands have shared edges. These points are called "shared points". For example, the back and front parts of models have shared vertices. That means for back-front connection vertices we have two shared points in the UV. The grouping vertices described as bisectional planes used to perform 3D deformations correctly. When we deform the vertices group, it will reshape both the front and back 3D model synchronously. Without these shared points and grouping, the deforming of the front of the clothing would be separated from back.

A 3D template includes multiple bi-sectional planes. A bi-sectional plane is a cross-section of the 3D template. Preferably but not necessarily, a bi-sectional plane is perpendicular to the height of the 3D template. Also preferably, the bi-section planes of a 3D template are parallel to each other. As such the bi-sectional plane around the torso area of the 3D template is elliptical. In some embodiments, each 3D control point belongs to a bi-sectional plane of the 3D template, and as such, the 3D control points are grouped based on which bi-sectional plane they belong to.

Figure 5B:
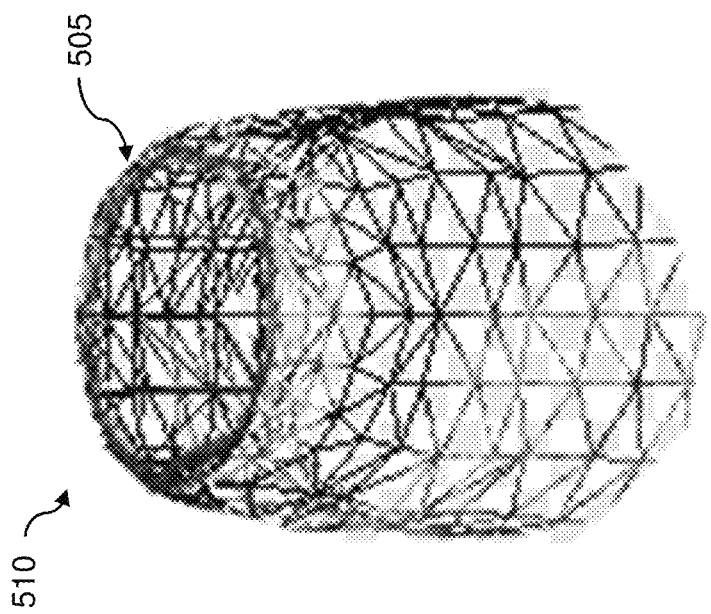

FIG. 5A illustrates an example bi-sectional plane 505 on a 3D top template 510. As shown the bi-sectional plane 505 is a cross section at around the hip area of the 3D model template 510. On this bi-sectional plane 505, there are two control points—control point 515 and control point 520. FIG. 5B illustrates a cross-section of the 3D top template 510 that is sliced at the bi-sectional plane 505. Similarly, referring back to FIG. 2A, the 3D tops template 205 is shown to have multiple bi-sectional planes, including bi-sectional plane 225 and bi-sectional plane 230. In this example, the control point 215 belongs to the bi-sectional plane 225, and the control point 220 belongs to the bi-sectional plane 230.

Referring back to FIG. 1, the 3D model generation engine 105 is programmed to place the 2D contours on fixed size canvas, and then overlay the pre-processed 2D image of the clothing onto the canvas. The image needs to be dropped onto the precise location inside contour and scale into correct size so it can be fitted inside the contour perfectly. Images could have various sizes and clothes can be in any angles. In order to automate this process, the 3D model generation engine 105 of some embodiments utilizes a configuration file stored in the database 110.

The configuration file defines (1) the location where the image of the clothing needs to be placed on the canvas and (2) scaling based on the type of clothing. For example, the configuration file can define, for a skirt, that the image of the skirt should be overlaid on top of the top-model front 2D contour 305, and that the top of the skirt should be placed at around the control point 320.

Figure 5C:
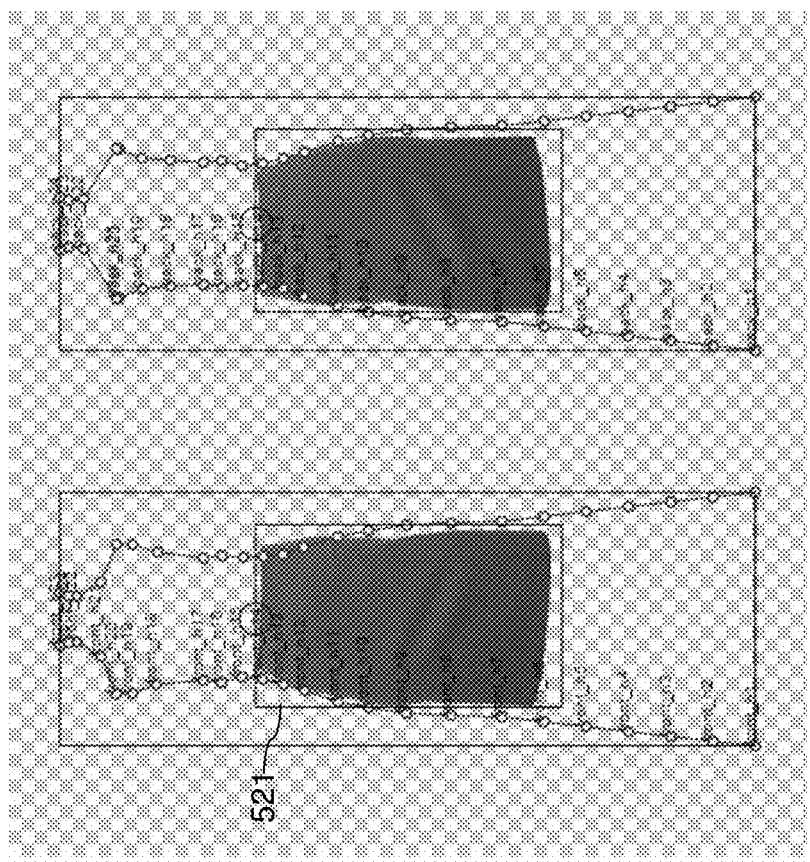
FIG. 5C illustrates a boundary set for automatically resizing the 2D image to fit the 2D contour.

Once the 2D image is placed at the proper location on the canvas, the 2D image may still be outside of the contour, due to the size difference between the clothing that appears in the 2D image and the 2D contour. As such, the 3D model manager 120 is programmed to resize 2D image so that the clothing entirely fits inside the contour. To do that, the 3D model manager 120 first defines a boundary around the 2D control points based on the type of clothing. FIG. 5C illustrates resizing of a dress to fit inside a boundary. In this example, since the piece of clothing is a skirt, the boundary 521 is defined to be around the 2D control points around the waist area, the hip area, and the thigh area. Preferably, the boundary 521 completely encloses all of the relevant 2D control points. The 3D model manager 120 is programmed to determine the maximum width and maximum height of the piece of clothing by analyzing the alpha and non-alpha pixels, and reduce the size of the 2D image such that the maximum width and maximum height of the piece of clothing is just smaller than the boundary.

Auto-pinning

FIG. 6A illustrates a dress 605 that was overlaid on a 2D contour 610 specifically designed for dresses. The 2D contour 610 corresponds to the 3D tops template 510 of FIG. 5A. That is, each 2D control point on the 2D contour 610 corresponds to a 3D control point on the 3D tops template 510. For example, 2D control points 610 and 620 correspond to the 3D control points 515 and 520, respectively.

As shown, even though the dress 605 is sized properly for the 2D contour 610, some of the 2D control points are located at the wrong positions of the dress 605, and others are even outside of the area covered by the dress 605. As such, the 3D model manager 120 is programmed to use the auto-pinning module 130 to automatically correct the location of the 2D control points based on the piece of clothing that is overlaid on the 2D contour.

The auto-pinning module 130 is programmed to analyze the 2D image to derive section information of the piece of clothing on the 2D image. In some embodiments, the auto-pinning module 130 is programmed to scan the pixels on the 2D image row by row to determine the edge of different areas of the piece of clothing (e.g., sleeve, torso area, shoulder area, arm, wrist, hip area, etc.). When clothes have sleeves, the auto-pinning module 130 is programmed to examine the image pixels and look for spacing between sleeve and body to distinguish the body portion versus sleeve portion on the image. In the case that the sleeve is attached to the body of the clothing on the 2D image (i.e., no spacing between the sleeve and the body), the auto-pinning module 130 is programmed to move the 2D control points of the sleeve to the most exterior pixels and move the 2D control points of the body based on a pre-determined standard width of the sleeve inside. When the clothes are sleeveless, the auto-pinning module 130 is programmed to hide the 2D control points that correspond to the sleeves portion.

As mentioned before, each 2D control point corresponds to a specific 3D control point on the template (i.e., a specific location on the 3D model). The auto-pinning module 130 is programmed to adjust the position of the 2D control points based on the information it derived. In some embodiments, the auto-pinning module 130 is programmed to simply move the 2D control points inward or outward so that the 2D control points are located on the edge of the piece of clothing (instead of located within the area of the piece of clothing on the 2D image or outside of the area of the piece of clothing on the 2D image). The edge of the piece of clothing can be determined as the point where the pixels transition from alpha to non-alpha, or from non-alpha to alpha.

For example, since the 2D control points 615 and 620 are located inside the area of the dress 605, the auto-pinning module 130 is programmed to move the 2D control points 615 and 620 outward (i.e., moving the 2D control point 615 to the left and moving the 2D control point 620 to the right) until they reach the edge of the dress 605. FIG. 6B illustrates the resulting 2D control points 615 and 620 on the 2D contour 610 after the adjustment.

It is preferable to obtain at least one 2D image of the piece of clothing from a front perspective and one 2D image of the piece of clothing from a back perspective. However, if only one front view image of the piece of clothing is obtained, the 3D model manager 120 is programmed to generate a back view 2D image based on the front view image. In some embodiments, the 3D model manager 120 is programmed to simulate the texture and pattern of the back of the piece of clothing based on the front view image.

The auto-pinning module 130 is programmed to perform the auto-pinning process (e.g., adjustment positions of the 2D control points) using the method described above for both the front view 2D image and the back view 2D image.

In order to get the texture on the side of the piece of clothing, the 3D model manager 120 is programmed to use special techniques such as UV Mapping to stretch the front and back edges of the clothing texture to cover the missing texture on the sides of the clothing.

It has been contemplated multiple approaches can be used to wrap the texture of the piece of clothing into the 3D model to cover the missing side texture. Under one approach, the 3D model manager 120 is programmed to stretch the pixels that represent the two sides of the piece of clothing in the 2D images (e.g., half from front and half from back) to meet in midpoint of each side. This is best to be used for plane color textures, otherwise the side will look little distorted.

Under another approach, the 3D model manager 120 is programmed to stretch the texture of the piece of clothing in the 2D images evenly (e.g., evenly for both the front and back image) until it is large enough to cover both the missing side.

Under yet another approach, the 3D model manager 120 is programmed to not stretch the front at all, but to make all the stretching on back image to cover all the sides. But the connection on side will be more toward the front. This is useful when the front image cannot be stretched and required to retain exact image look but back has plane color.

Map of UV to Vertices

As mentioned earlier, UV Mapping is a technique that permits transfer of pixels on the 2D image onto polygons on the 3D clothing model. The 3D model manager 120 is programmed to use the 2D contour to pick usable area of the texture and use the 2D control point to map the texture on the 2D image to different locations on the 3D clothing model. That way, the 3D model manager 120 is able to wrap the texture on correct locations on the 3D clothing template.

Deforming and Reshaping the 3D Model

The 3D clothing template needs to be deformed (adjusting shape and size) according to the features and information derived from the 2D image. In some embodiments, the 3D model manager 120 uses the deformation module 135 to deform the 3D model. In some of these embodiments, the deformation module 135 is programmed to deform the 3D clothing template to generate a 3D model by one or more of the following: (1) using the clothing measurements, (2) features and information derived from the 2D image, (3) manually manipulate the group of vertices to visually simulate the reshaping of the model, and (4) utilizing generic sizing charts from a database of average sizes per country.

For example, the deformation module 135 is programmed to apply the clothes measurement values automatically to deformation group. As mentioned before, all 3D control points are numbered and belong to specific locations of the 3D clothing models. When we have the clothing measurement we can apply them to deform clothes model to its respective area.

The initial 3D template is designed for a specific size. For instance the "tops-model" chest is n inches, hip is m inches. If the sizing chart indicate that the chest should be n+1 and hip should be m+5 for that clothes, the deformation module 135 is programmed to move the vertices of waist and hip by 1 and 5 inches.

In another example, if the waist size of a piece of clothing is n+2 inches and the size of waist for the default template is n. The deformation module 135 is programmed to deform the group of the 3D control points (that belong to the bisectional plane associated with the waist section) by 2 inches. The deformation module 135 is also programmed to move the vertices of the 3D model that resides around the group of 3D control points to become n+2 inches.

Under the second approach, the deformation module 135 is programmed to deform the 3D clothing template based on the adjusted 2D control points on the corresponding 2D contour (front and back contours). In some embodiments, the deformation module 135 is programmed to calculate the distance between the two 2D control points that belong to the same bisectional plane, and adjust the positions of the corresponding 3D control points (and vertices) on the 3D clothing template based on the distance. For example, if the distance between the 2D control point 615 and the 2D control point 620 has a value of 35, and the distance in the original 2D contour template has a value of 20, the deformation module 135 is programmed to adjust the 3D control points 515 and 520 and related vertices on the 3D tops template 510 to enlarge the bisectional plane 505 (make it wider) by the same ratio.

The pixels values on the 2D image can be converted to equivalent inches.

As mentioned above, the 3D control points are grouped based on the bisectional planes to which the 3D control points belong. The bisectional planes are usually elliptical in shape. An ellipse usually has two important dimensions: the longest radius (referred to as the "major radius" hereinafter) and the shortest radius (referred to as the "minor radius" hereinafter). The deformation module 135 of some embodiments is programmed to keep the minor radius of each bisectional plane fixed, and adjust the major radius based on the newly adjusted positions of the corresponding 2D control points (or distance between them). For example, the deformation module 135 is programmed to calculate the percentage differences of the major radius utilizing the difference in distances between the two 2D control points as explained above. The deformation module 135 is programmed to then increase/decrease all vertices of that group by that percentage to make it a larger or a smaller ellipse. Based on the adjusted distance between the 3D control points on that bisectional plane, the deformation module 135 is programmed to determine the new circumference of the ellipse.

The deformation module 135 is programmed to deform every bisectional plane associated with the different parts of the 3D clothing template (e.g., torso, sleeve, and legs, etc.) using the method described above until the entire clothes' shape changes into the shape of the piece of clothing in the 2D image. Some group will be tighter and some group will be looser or same size until the whole clothe reshapes. It is noted that the resulting 3D model is a 3D model of the piece of clothing (e.g., dress, skirt, top, etc.), and not a 3D model of an avatar that is overlaid with a piece of clothing. The deformation module 135 is programmed to generate the resulting 3D model 180 based on the deformed 3D clothing template for the piece of clothing. The 3D model 180 is available to be viewed and manipulated by a user via the user interface 125.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method of generating a three-dimensional (3D) model of an object based on a two-dimensional (2D) image of the object, comprising:

obtaining a 3D model having a plurality of bisectional planes, wherein each bisectional plane comprises a group of 3D control points along the edge of the bisectional plane;

determining locations for a plurality of 2D control points on a representation of the object appearing in the 2D image, wherein each 2D control point in the plurality of 2D control points corresponds to a distinct 3D control point;

modifying the 3D model by adjusting each bisectional plane based on the determined locations of the plurality of 2D control points on the 2D image;

obtaining a 2D contour template having an outline and 2D control points located along the outline;

overlaying the 2D image over the 2D contour template; and adjusting the locations of the 2D control points on the 2D contour template by analyzing a difference between the outline of the object in the 2D contour template and the representation of the object in the 2D image.

2. The computer-implemented method of claim 1, wherein the outline comprises a portion of the plurality of bisectional planes, and wherein each of the 2D control points corresponds to a 3D control point;

wherein analyzing the difference comprises performing a pixel-level analysis.

3. The computer-implemented method of claim 1, wherein analyzing the difference comprises performing a pixel-level analysis to determine a first non-alpha pixel from one side of the 2D image to the other side of the 2D image and to match a pixel on the 2D image with a 2D control point on the 2D contour template.

4. The computer-implemented method of claim 1, wherein at least two of the bisectional planes are parallel to each other.

5. The computer-implemented method of claim 1, wherein the 2D image comprises a representation of a front view of the object.

6. The computer-implemented method of claim 5, further comprising:

obtaining a second 2D image comprising a back view of the object;

determining locations for a second plurality of 2D control points on the representation of the back view of the object appearing on the second 2D image;

obtaining a second 2D contour template having a second outline and second set of 3D control points located along the second outline;

overlaying the second 2D image over the second 2D contour template; and modifying the 3D model by adjusting locations of the second 2D control points on the second 2D contour plane by analyizing a difference between the second 2D image and the second 2D contour template, wherein the computer-implemented method only uses 2D image data from the first 2D image and the second 2D image to modify the 3D model.

7. The computer-implemented method of claim 1, wherein the object comprises a piece of clothing.

8. The computer-implemented method of claim 1, wherein obtaining the 3D model comprises selecting a 3D model template from a group of 3D model templates comprising at least a 3D pants template, a 3D top template, and a 3D dress template.

9. A system for generating a three-dimensional (3D) model of an object based on a two-dimensional (2D) image of the object, comprising:

a database storing a plurality of 3D model templates associating with different types of objects, wherein each 3D model has a plurality of bisectional planes, wherein each bisectional plane comprises a group of 3D control points along the edge of the bisectional plane; and a 3D model generation engine comprising at least one processor and a memory, the memory storing software instructions that when executed by the at least one processor, causing the at least one processor to perform the following steps:

selecting a 3D model template from the plurality of 3D model templates based on a type of object appeared in the 2D image;

determining locations for a plurality of 2D control points on a representation of the object appearing in the 2D image, wherein each 2D control points in the plurality of 2D control points corresponds to a distinct 3D control point; and modifying the 3D model template by adjusting each bisectional plane based on the determined locations of the plurality of 2D control points on the 2D image;

obtaining a 2D contour template having an outline of the 3D model and 2D control points located along the outline, wherein each of the 3D control points corresponds to a 3D control point;

overlaying the 2D image over the 2D contour template; and adjusting the locations of the 2D control points on the 2D contour template by analyzing a difference between the outline of the object in the 2D contour template and the representation of the object in the 2D image.

10. The system of claim 9, wherein the 3D model generation engine is programmed to analyze the difference by performing a pixel-level analysis.

11. The system of claim 9, wherein the 3D model generation engine is programmed to analyze the difference by matching a pixel on the 2D image with a 2D control points on the 2D contour template.

12. The system of claim 9, wherein the 3D model generation engine is programmed to analyze the difference by performing a pixel-level analysis to determine a first non-alpha pixel from one side of the 2D image to the other side of the 2D image and matching a pixel on the 2D image with a 2D control point on the 2D contour template.

13. The system of claim 9, wherein at least two of the bisectional planes are parallel to each other.

14. The system of claim 9, wherein the 2D image comprises a representation of a front view of the object.

15. The system of claim 14, wherein the 3D model generation engine is further programmed to:

obtain a second 2D image comprising a representation of a back view of the object;

determin locations for a second plurality of 2D control points on the representation of the back view of the object appeared on the second 2D image;

modify the 3D model template by adjusting each bisectional plane based on the determined locations of the second plurality of 2D control points on the second 2D image.

16. The system of claim 9, wherein the object is a piece of clothing.

17. The system of claim 9, wherein the plurality of 3D model templates comprise at least a 3D pants template, a 3D top template, and a 3D dress template.

18. A computer-implemented method of generating a three-dimensional (3D) model of an object, comprising:

obtaining a 3D model having a plurality of bisectional planes, wherein each bisectional plane comprises a group of 3D control points along the edge of the bisectional plane;

obtaining only one 2D image of the object;

determining locations for a plurality of 2D control points on a representation of the object appearing in the only one 2D image, wherein each 2D control point in the plurality of 2D control points corresponds to a distinct 3D control point;

modifying the 3D model by adjusting each bisectional plane only based on the determined locations of the plurality of 2D control points on the only one 2D image;

obtaining a 2D contour template having an outline of the object and 2D control points located along the outline;

overlaying the 2D image over the 2D contour template; and adjusting the locations of the 2D control points on the 2D contour template by analyzing a difference between the outline of the object in the 2D contour template and the representation of the object in the 2D image.

* * * * *